United States Patent
Pearson et al.

(10) Patent No.: US 7,457,008 B1
(45) Date of Patent: Nov. 25, 2008

(54) ADAPTIVE SCAN DRIVER AND SCAN PERIPHERAL

(75) Inventors: Daniel R. Pearson, Citrus Heights, CA (US); David A. Kumpf, Rocklin, CA (US); Glenn G. Carcido, Grass Valley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2081 days.

(21) Appl. No.: 09/680,069

(22) Filed: Oct. 5, 2000

(51) Int. Cl.
*H04N 1/04* (2006.01)
*H04N 1/46* (2006.01)

(52) U.S. Cl. ............................. 358/474; 358/505

(58) Field of Classification Search ............... 358/474, 358/408, 1.15, 403, 407, 434, 505; 709/203, 709/217, 218, 219
See application file for complete search history.

(56) References Cited

U.S. PATENT DOCUMENTS

| | | | |
|---|---|---|---|
| 5,325,527 A * | 6/1994 | Cwikowski et al. | 709/222 |
| 5,911,044 A * | 6/1999 | Lo et al. | 709/203 |
| 6,020,971 A * | 2/2000 | Kato et al. | 358/1.14 |
| 6,289,371 B1 * | 9/2001 | Kumpf et al. | 709/203 |
| 6,301,012 B1 | 10/2001 | White et al. | |
| 6,424,424 B1 | 7/2002 | Lomas et al. | |
| 6,473,811 B1 * | 10/2002 | Onsen | 710/15 |

FOREIGN PATENT DOCUMENTS

| | | |
|---|---|---|
| JP | 2000-033755 A | 2/2000 |
| JP | 2000-215128 A | 8/2000 |

\* cited by examiner

*Primary Examiner*—Douglas Q Tran

(57) ABSTRACT

A driver of the invention adapts to scan peripherals using information in capability descriptor provided by scan peripherals or a capability descriptor selected based upon scan peripheral model information. A driver of the invention automatically determines a scan peripheral's capabilities using information from the capability descriptor, and uses the information to configure itself from a set of driver modules. A user interface and scan job are then run through options enabled by the appropriate set of driver modules as determined by the capability descriptor. A preferred embodiment server of the invention embodies such an adaptive driver that queries a scan peripheral when it is first connected to the server. If an appropriate capability descriptor is obtained in response to the query, the capability descriptor is stored for use during a scan job. When a scan job using that peripheral is requested, user interface code extracts information from the capability descriptor to allow the user interface to dynamically change dependent upon the peripheral's capabilities as indicated by the information from the capability descriptor. Capabilities indicated by a capability descriptor might include, for example, dots per inch choices, paper sizes, color/grayscale options, image formats, and whether or not a preview scan is supported. The appropriate capabilities become selectable through a user interface at a client computer. When a scan job is directed, scan driver software/firmware uses selected parameters passed by the client and the information from the stored capability descriptor to determine an appropriate command protocol and image encoding. A set of driver modules is then dynamically linked to create an appropriate driver for the scan job.

13 Claims, 4 Drawing Sheets

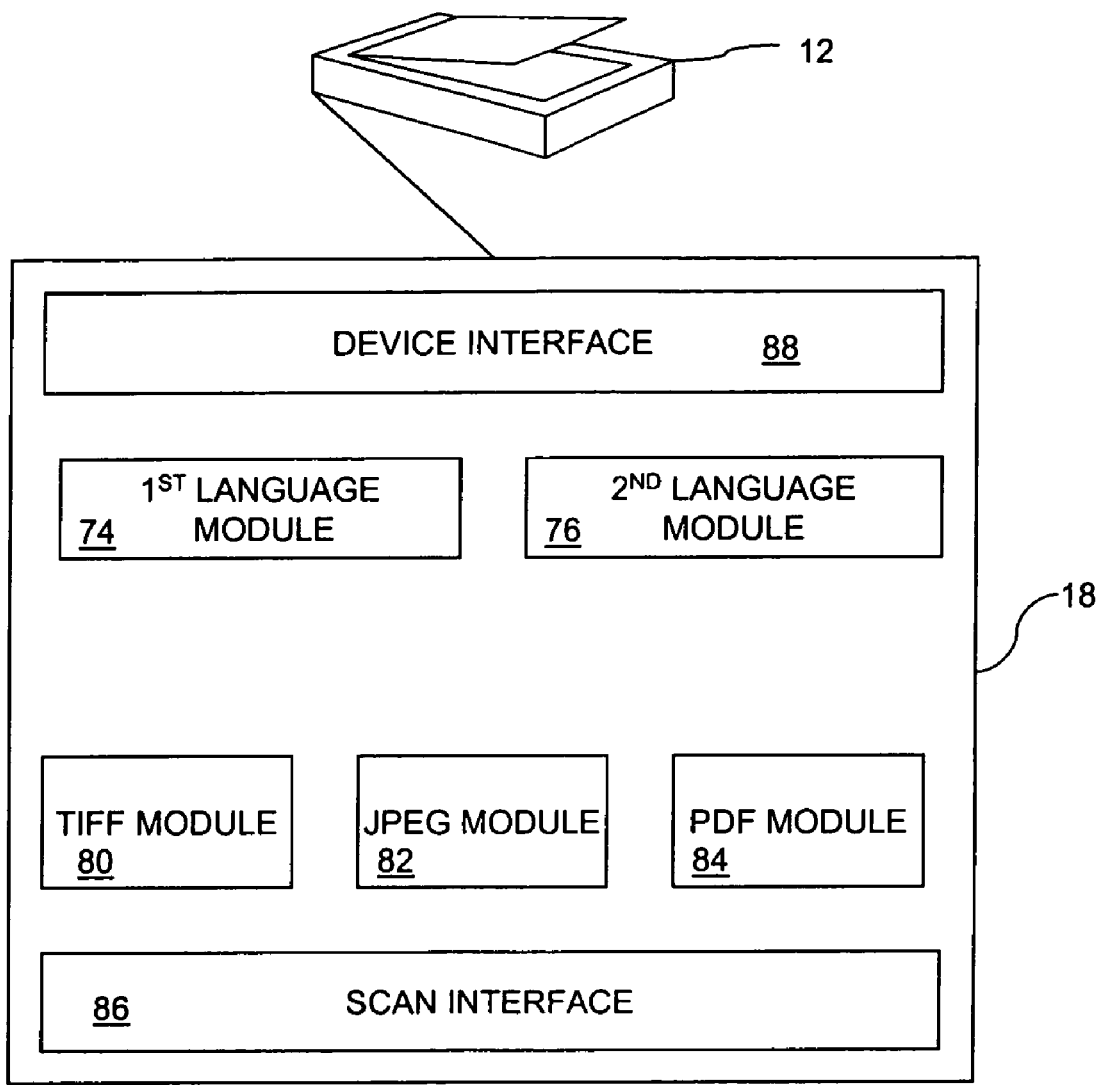

ADAPTIVE SCAN DRIVER AND SCAN PERIPHERAL

FIELD OF THE INVENTION

The field of the invention is scan peripherals. The invention is directed toward a driver for controlling scan jobs directed to a scan peripheral. A driver of the invention may be embodied in a dedicated peripheral server.

BACKGROUND OF THE INVENTION

A scan peripheral is a scanner or multi-function device including a scanning function. Scan peripherals may be accessed through a server so that multiple users may use the same scan peripheral over a network, for example. A single machine may also directly access or share access to a scan peripheral or multiple peripherals through a server. A single machine might also contain a driver to interface to a scan peripheral directly.

A scan peripheral server is typically realized in software that is installed in some type of general purpose computer system. Hardware might also be used, but would be more difficult to realize. Server software may be run in the general purpose computer of a specialized physical device, such as a Hewlett-Packard JetDirect® external or internal server. Jet-Direct® devices can control multiple scan peripherals, including scanners and multi-function peripherals. Each scan peripheral requires a driver, which functions to control a scan job from a particular peripheral according to the capabilities and protocol for the particular peripheral. A JetDirect® server or other server that interfaces to multiple scan peripherals typically includes multiple drivers to facilitate control of scan jobs from different scan peripherals.

A problem arises when a scan peripheral server having a set of drivers or a stand-alone driver encounters a scan peripheral unaccounted for by the existing driver(s). This may happen, for example, when scan peripherals are replaced with new scan peripherals or new scan peripherals are added. In such a case, a new scan peripheral will not work with the old server/driver and a user must take additional inconvenient steps to make the new scan peripheral work. Expense and frustration often result.

Thus, there is a need for an improved scan peripheral driver. It is an object of the invention to provide such a driver. A further object of the invention is to provide an improved scan peripheral server and improved scan peripheral.

SUMMARY OF THE INVENTION

A driver of the invention meets such a need by adapting to scan peripherals using information in a capability descriptor provided by a scan peripheral or a capability descriptor associated with a scan peripheral based on the model of the scan peripheral. A driver of the invention automatically determines a scan peripheral's capabilities using information from the capability descriptor, and uses the information to configure itself from a set of driver modules. A user interface and scan job are then run through options enabled by the appropriate set of driver modules as determined by the capability descriptor.

A preferred embodiment server of the invention embodies such an adaptive driver that queries a scan peripheral when it is first connected to the server. If an appropriate capability descriptor is obtained in response to the query, the capability descriptor is stored for use during a scan job. When a scan job using that peripheral is requested, user interface code extracts information from the capability descriptor to allow the user interface to dynamically change dependent upon the peripheral's capabilities as indicated by the information from the capability descriptor. Capabilities indicated by a capability descriptor might include, for example, dots per inch choices, paper sizes, color/grayscale options, image formats, and whether or not a preview scan is supported. The appropriate capabilities become selectable through a user interface at a client computer. When a scan job is directed, scan driver software/firmware uses selected parameters passed by the client and the information from the stored capability descriptor to determine an appropriate command protocol and image encoding. A set of driver modules is then dynamically linked to create an appropriate driver for the scan job.

The invention also includes a scan peripheral or multi function peripheral capable of supplying a capability descriptor in response to a request. The preferred driver of the invention expects to receive a capability descriptor. However, in an aspect of the invention, the preferred driver or a preferred server including the driver may also address the case of scan peripherals or multi function peripherals that are not capable of providing a capability descriptor in response to a request. In this aspect of the invention, the preferred driver includes stored capability information corresponding to a set of known scan peripherals or multi function peripherals. When the driver fails to receive an appropriate capability descriptor in response to a request, the driver then selects from the stored capability information based upon the model of scan peripheral. Model information is typically provided by conventional scan peripherals on request.

BRIEF DESCRIPTION OF THE DRAWINGS

FIGS. 2a and 2b are a flowchart illustrating steps performed by a preferred driver program of the invention and FIG. 3 is a block diagram for a preferred driver program of the invention usable in the server of FIG. 1.

DETAILED DESCRIPTION OF THE PREFERRED EMBODIMENTS

The invention, in its most preferred embodiment, includes a scan peripheral, i.e., a scanner or a multi-function scan peripheral, that provides a scan driver a capability descriptor that the driver can use to dynamically configure itself. However, a driver of the invention may also account for the case where a scan peripheral is unable to provide a capability descriptor by determining a model of the scan peripheral and selecting an appropriate predetermined capability description for the scan peripheral. The invention is particularly beneficial to dedicated servers, such as Hewlett-Packard JetDirect® servers, that operate with many different types of peripherals. Such servers operate under constraints that make it harder to deploy and install new software to address a peripheral model unaccounted for by the software originally resident in the server. Artisans will appreciate that the adaptive driver part of the invention may also be realized outside of a dedicated server as software or in any general purpose computer having a peripheral interface.

Figure 1:
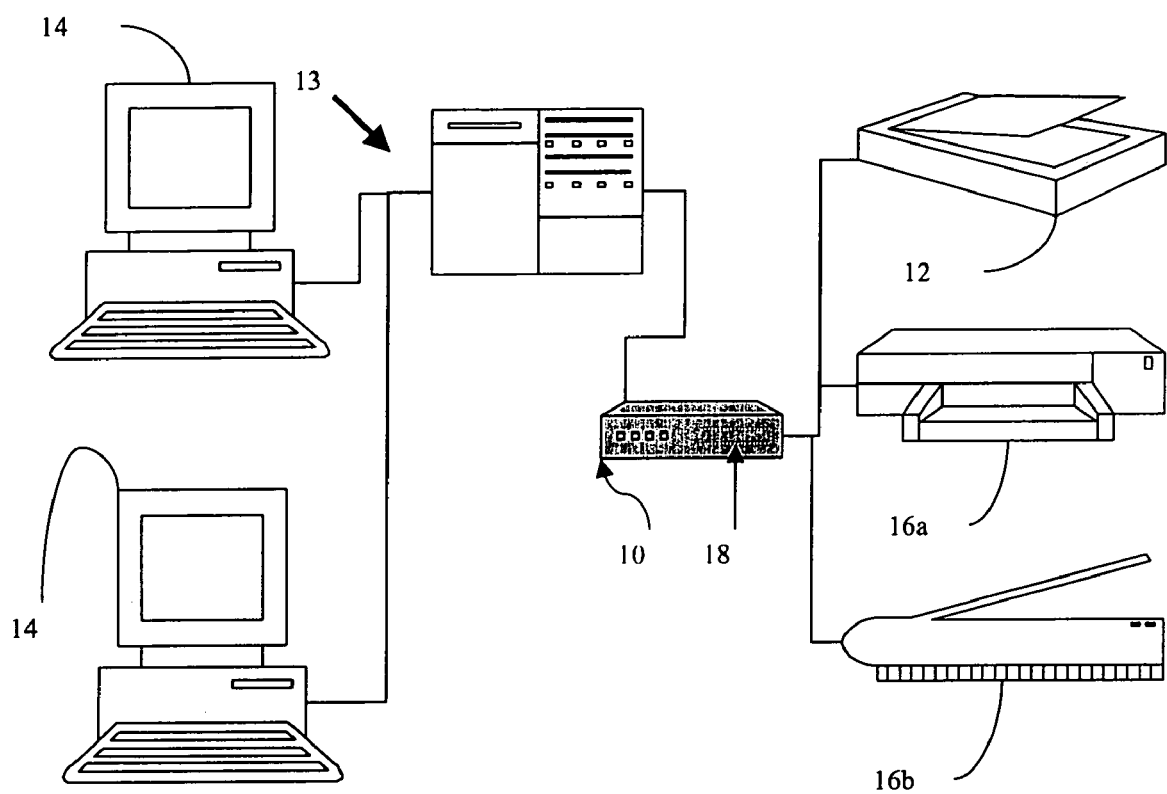
FIG. 1 is a block diagram illustrating a preferred server of the invention connected to a network and multiple peripherals.

FIG. 1 illustrates the preferred case where a preferred server 10 connects a peripheral 12 to a network 13 accessible by one or more client computers 14. The server 10 also provides an interface to one or more additional peripherals 16a, 16b. The server 10 includes a driver 18. The driver 18 might alternately be resident in another device, such as a computer or server directly interfaced to one or more peripherals.

The peripheral 12 and peripherals 16a, 16b are preferably constructed in accordance with the invention to provide a capability descriptor in response to a query by the driver 18. A capability descriptor provides information about the scan capabilities offered by the peripheral and is preferably realized as a data string. The capability descriptor may include, for example, one or more of dots per inch choices, paper sizes, color/grayscale options, image formats, and whether or not a preview scan is supported.

Figure 2A:
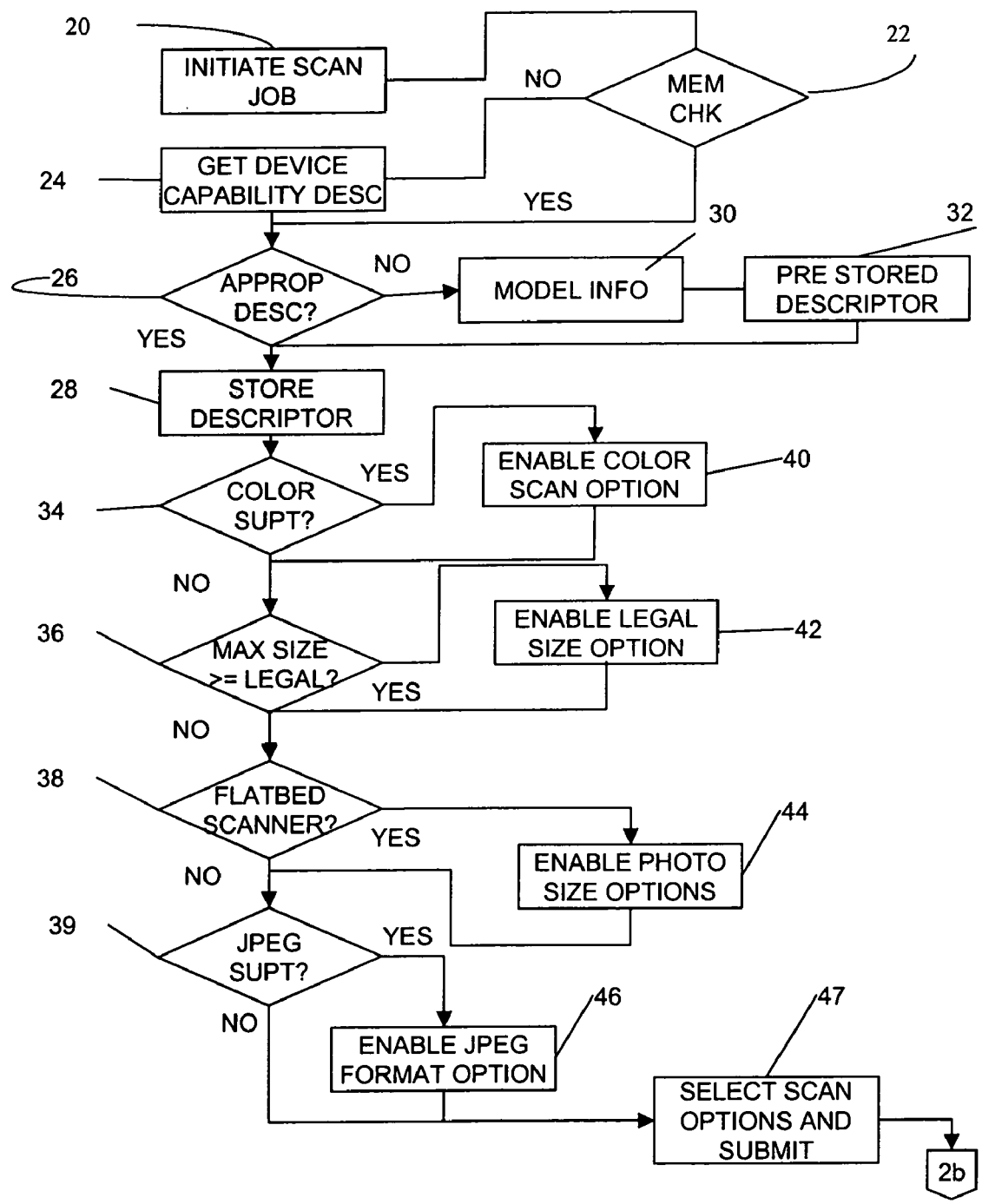

Referring now to FIG. 2a, the manner in which the preferred driver 18 of the invention conducts a scan job is shown. A scan job is initiated 20 upon a request from a client computer. Memory is checked 22 to see if a capability descriptor has been previously stored for the scan peripheral to which the scan job is directed. If there is no previously stored capability descriptor, a query is made to obtain 24 a capability descriptor from the peripheral to which the scan job is directed. It is then determined 26 whether an appropriate capability descriptor has been received. A received capability descriptor is stored 28 in memory for future use with scan jobs associated with the peripheral from which it was received. If there is no received or previously stored capability descriptor, the response to the query from the scan peripheral is checked 30 for model information. This will be the case where the scan peripheral has not been made to provide capability descriptors. Model information is typically provided by conventional scan peripherals on request. If necessary, a separate request for the model information is conducted. Using the model information, memory is referenced 32 to select a pre-stored capability descriptor that matches the model information.

Figure 2B:
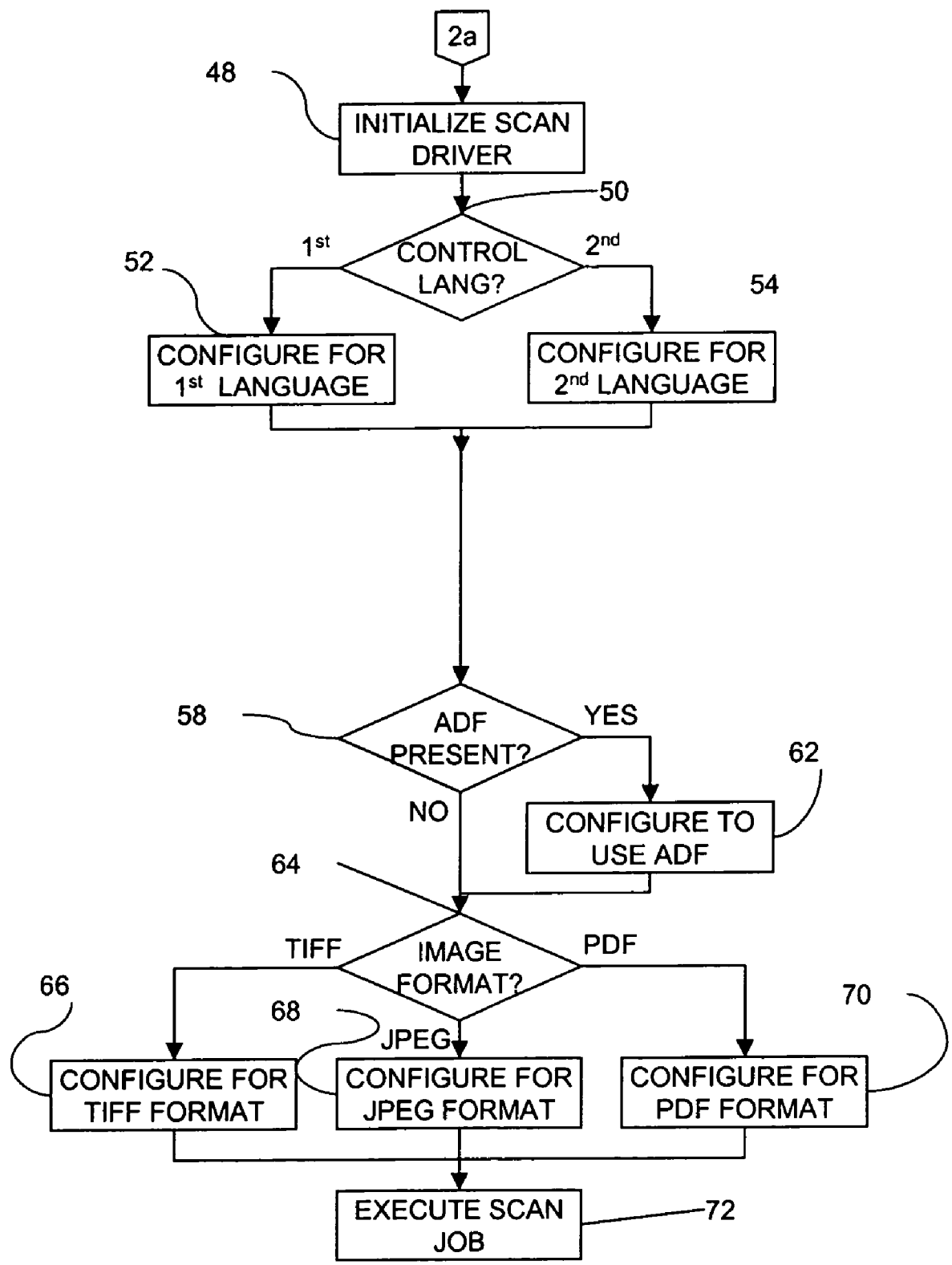

Information contained in the capability descriptor provides the basis for identifying the exact nature of scanning supported by a scan peripheral with which the capability descriptor is associated. The preferred example in FIGS. 2a and 2b provides a standard set of capability options, though others are possible. The capabilities of the scan peripheral obviously affect the type of scan which can be selected, so the driver operation in FIG. 2a first examines the capabilities to alter a user interface provided on a client machine which initiated the request for a scan job.

In the preferred embodiment of FIG. 2a, a capability descriptor is examined for whether its associated scan peripheral supports color scanning 34, for the associated scan peripheral's maximum scan size 36, for whether the associated peripheral supports a flatbed scan 38, and for whether the associated peripheral supports the JPEG image format 39. For purposes of illustrating the invention, typical dynamic options are shown. Other choices, such as PDF and TIFF formats, are assumed to be always available in the driver. The list of options to be enabled may be altered as a matter of design choice, as will be recognized by artisans. For each dynamic option in FIG. 2a, a positive indication results in the option being enabled. Thus, in FIG. 2a, options may be enabled for a color scan 40, for a legal size scan 42, for a photo size scan 44, and for a JPEG format 46.

Each enabled option is submitted 47 to the client. This allows activation of appropriate options within a scan interface in the client machine. Once a user selects parameters for a scan from among the enabled options and any other standard parameters, scan driver initialization commences 48 as shown in FIG. 2b. Returned parameters allow the driver 18 to configure itself based upon those selected parameters and the scan peripheral's capabilities. As in FIG. 2a, only typical dynamic options based on the capability descriptor are illustrated, i.e., a typical set of options that might vary from one model of scan peripheral to another. There are many more possible parameter choices that do not depend on the descriptor, i.e., parameter choices commonly shared by most, if not all, scan peripherals. The latter type of parameter choice is not illustrated in FIG. 2b in order to keep the illustration simple.

In FIG. 2b, the driver 18 checks the control language 50 and then configures itself according to the control language, for example, as a first language configuration 52 or as a second language configuration 54. Scanning control languages may be manufacturer specific languages or industry shared languages. Support for ADF (automatic document feed) is checked 58 and a corresponding ADF scan 62 configuration is made. An image format parameter is checked 64 and the appropriate image format is configured, for example, as a TIFF format 64, a JPEG format 68 or a PDF format 70. Using the configured driver modules, the scan is then executed 72.

The modules allowing the driver 18 to configure itself are separate driver modules which become linked for a scan job according to selected parameters and capabilities. Driver modules must be organized to permit such linking. A preferred organization for driver modules is shown in FIG. 3. As in FIGS. 2a and 2b, only an exemplary set of dynamic modules are accounted for in FIG. 3, while others are likely to be used in practice. Driver modules on the same row are alternates. This permits linking through only one module from each row since the modules in each row are mutually exclusive choices. The organization in FIG. 3 is logical, of course, and any suitable software/firmware architecture may be employed to realize the logical organization and linking operation of the driver modules.

Referring to FIG. 3, which is based upon the available options in FIG. 2b, first language and second language modules 74, 76 form alternate options, and the image format modules, TIFF module 80, JPEG module 82 and PDF module 84 form alternate options. Scan data is routed through the enabled modules for the duration of a scan job executed by step 72 in FIG. 2b. The next job might request a different format and might be routed to a peripheral having different capabilities, so the data will likely be routed through different modules.

A scan interface module 86 interfaces the driver 18 to the rest of the system. The definition of the remaining system will vary according to where the driver is resident. In the case of the driver being in a network connected peripheral server, such as a JetDirect®, it includes a network code to transfer data to a destination client PC. In the case of a directly connected device, it is the interface to the software that requested the scan job. That software might display the image to the user, might insert it into a word processor document, might attach it to an e-mail message, might automatically archive it in permanent storage, etc. A device interface module 88 communicates with a scan peripheral 12. In the case where the driver is resident in a server, such as a JetDirect®, the device interface 88 may interface to multiple scan peripherals, or a scan peripheral and other types of peripherals, or any combination of common and different type peripherals.

Artisans will appreciate the flexibility provided by the invention. A driver of the invention dynamically handles scan peripherals having different capabilities without the need for update of the driver, a feature which is especially useful in a peripheral server.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A process for interfacing a client computer to one or more scan peripheral devices, the process comprising:
   querying a scan peripheral for a capability descriptor;
   determining whether an appropriate capability descriptor is obtained in response to said step of querying;
   storing a capability descriptor associated with a scan peripheral for which an appropriate information capability descriptor has been received as determined in said step of determining;
   configuring a scan driver for a scan job for a scan peripheral when a scan job is requested by a client by linking a set of pre-stored driving modules, a set of pre-stored driving modules being selected according to user set parameters in the scan job and capabilities indicated in a stored information capability descriptor concerning a scan peripheral to which the scan job is directed.

2. The process according to claim 1, further comprising a step of de-linking pre-stored driving modules upon completion of a scan job.

3. The process according to claim 1, wherein said step of configuring includes extracting information from a stored capability descriptor to alter a user interface dependent upon a peripheral's capabilities.

4. The process according to claim 1, wherein a capability descriptor stored in said step of storing comprises a string including fields indicating dots per inch capabilities, paper size capabilities, color/grayscale options, image formats supported, and whether or not a preview scan is supported.

5. A program for interfacing a client computer to one or more scan peripheral devices, the program comprising functions for:
   querying a scan peripheral for a capability descriptor;
   determining whether an appropriate capability descriptor is obtained in response to said step of querying;
   storing a capability descriptor associated with a scan peripheral for which an appropriate information capability descriptor has been received as determined in said step of determining;
   configuring a scan driver for a scan job for a scan peripheral when a scan job is requested by a client by linking a set of pre-stored driving modules, a set of pre-stored driving modules being selected according to user set parameters in the scan job and capabilities indicated in a stored information capability descriptor concerning a scan peripheral to which the scan job is directed, wherein
      the program is stored in a server which provides an interface to a network and at least one scan peripheral.

6. A program for interfacing a client computer to one or more scan peripheral devices, the program comprising functions for:
   querying a scan peripheral for a capability descriptor;
   determining whether an appropriate capability descriptor is obtained in response to said step of querying;
   storing a capability descriptor associated with a scan peripheral for which an appropriate information capability descriptor has been received as determined in said step of determining;
   configuring a scan driver for a scan job for a scan peripheral when a scan job is requested by a client by linking a set of pre-stored driving modules, a set of pre-stored driving modules being selected according to user set parameters in the scan job and capabilities indicated in a stored information capability descriptor concerning a scan peripheral to which the scan job is directed, wherein
      the program is stored in a computer connected to at least one scan peripheral.

7. The process according to claim 1, further comprising a functions for:
   obtaining a model of scan peripheral for a peripheral when said function for determining determines that an appropriate capability descriptor was not received in response to a query conducted by said function for querying; and
   associating a pre-stored capability descriptor with a scan peripheral whose model was determined by said step of obtaining.

8. A scan peripheral server having a network connection interface and one or more ports for connection to at least one scan peripheral, the server including:
   memory for storing capability descriptors defining capabilities of scan peripherals;
   memory for storing a set of driver modules; and
   a program for controlling execution of scan jobs requested from the network connection of a scan peripheral connected to one of said one or more ports, the program comprising functions for
      obtaining a capability descriptor from one or more scan peripherals connected to any of said one or more ports;
      storing a received capability descriptor in said memory for storing capability descriptors;
      accepting a scan job request from said network connection for one or more scan peripherals attached to said one or more ports;
      extracting capability information from a stored capability descriptor in response to a scan job;
      sending information to said network connection to modify a user interface;
      accepting parameters for a scan job from said network connection;
      linking driver modules from said set of driver modules according to capability information extracted by said function for extracting and parameters accepted by said function for accepting; and
      controlling a scan job according to the driver modules linked in said function for linking.

9. The server according to claim 8, wherein a capability descriptor comprises a data string of capability data.

10. The server according to claim 8, wherein said program for controlling execution of scan jobs further comprises:
   obtaining model information from any one or more scan peripherals connected to any of said one or more ports when said any one or more scan peripherals does not provide a capability descriptor; and
   associating a capability descriptor pre-stored in said memory for storing capability descriptors with said any one or more scan peripherals which does not provide a capability descriptor according to model information obtained in said step of obtaining.

11. The server according to claim 8, wherein a data string is formatted as a data string including a scan language, an image format, a resolution and a preview scan capability.

12. A peripheral including a scanning capability, the peripheral comprising:
   a scan system for scanning documents and producing electronic data therefrom;
   an interface for connecting to a client machine or server;
   memory for storing data;
   a scan capability descriptor stored in said memory; and a controller for communicating with said client machine or server through said interface to perform a scan job, said controller sending said capability descriptor to said client machine or server through said interface in response to a query requesting a capability descriptor.

13. A method for controlling a scan job directed to a peripheral including a scanning function, the method comprising steps of:

obtaining a capability descriptor from the peripheral including the scanning function; then, to implement a scan job, configuring a scan driver from a set of scan drive modules based upon capabilities indicated by said capability descriptor and parameters included in the scan job.

* * * * *

UNITED STATES PATENT AND TRADEMARK OFFICE
CERTIFICATE OF CORRECTION

PATENT NO.         : 7,457,008 B1
APPLICATION NO. : 09/680069
DATED              : November 25, 2008
INVENTOR(S)        : Daniel R. Pearson et al.

Page 1 of 1

It is certified that error appears in the above-identified patent and that said Letters Patent is hereby corrected as shown below:

In column 5, line 51, in Claim 5, after "wherein" insert -- , --.

In column 6, line 3, in Claim 6, after "wherein" insert -- , --.

Signed and Sealed this

Twelfth Day of May, 2009

JOHN DOLL
*Acting Director of the United States Patent and Trademark Office*